(12) United States Patent
Kennedy et al.

(10) Patent No.: US 9,949,086 B2
(45) Date of Patent: Apr. 17, 2018

(54) AUTOMATIC SYSTEM CONTROL BASED ON MOBILE DEVICE LOCATION RELATIVE TO A PHYSICAL SPACE

(71) Applicant: Canary Connect, Inc., New York, NY (US)

(72) Inventors: Tiernan Kennedy, New York, NY (US); Michael Klein, Hartsdale, NY (US); Eric Weaver, Astoria, NY (US); Sergey Morozov, Brooklyn, NY (US); Michael Schroeder, Dayton, OH (US)

(73) Assignee: Canary Connect, Inc., New York, NY (US)

( * ) Notice: Subject to any disclaimer, the term of this patent is extended or adjusted under 35 U.S.C. 154(b) by 0 days.

(21) Appl. No.: 15/487,613

(22) Filed: Apr. 14, 2017

(65) Prior Publication Data

US 2017/0303085 A1 Oct. 19, 2017

Related U.S. Application Data

(60) Provisional application No. 62/323,992, filed on Apr. 18, 2016.

(51) Int. Cl.
*H04W 4/02* (2009.01)
*H04L 12/28* (2006.01)
*H04W 84/12* (2009.01)
*H04W 84/04* (2009.01)

(52) U.S. Cl.
CPC ......... *H04W 4/023* (2013.01); *H04L 12/2823* (2013.01); *H04M 2250/10* (2013.01); *H04W 84/042* (2013.01); *H04W 84/12* (2013.01)

(58) Field of Classification Search
CPC ...................................... H04W 4/02

USPC .......................................... 455/456.1–456.6
See application file for complete search history.

(56) References Cited

U.S. PATENT DOCUMENTS

| 8,036,679 | B1 | 10/2011 | Barbeau et al. |
| 8,531,294 | B2 | 9/2013 | Slavin et al. |
| 8,849,301 | B2 | 9/2014 | Husney |
| 9,141,150 | B1 | 9/2015 | Trundle et al. |
| 9,154,001 | B2 | 10/2015 | Dharwada et al. |
| 9,208,676 | B2 | 12/2015 | Fadell et al. |
| 9,247,378 | B2 | 1/2016 | Bisson et al. |

(Continued)

OTHER PUBLICATIONS

NEST; Introducing Family Accounts and Home/Away Assist; Mar. 10, 2016.

*Primary Examiner* — Michael T Vu
(74) *Attorney, Agent, or Firm* — Sheehan Phinney Bass & Green PA (57) ABSTRACT

A system, such as a security monitoring system, includes one or more devices at a physical space. Each device performs a function (e.g., security monitoring) at the physical space, and at least one is able to interact, via a network, with a mobile device. The system is automatically controlled based on a location of the mobile device. The system tracks the mobile device with a first tracking technique when located outside both a home region associated with the physical space and an active monitoring region that surrounds the home region, determines, based on the tracking information, whether the mobile device is within the active monitoring region, and switches to a second, different, tracking technique if it is determined that the mobile device is within the active monitoring region.

20 Claims, 6 Drawing Sheets

(56) References Cited

U.S. PATENT DOCUMENTS

| | | |
|---|---|---|
| 9,798,979 B2 * | 10/2017 | Fadell ................... G06N 5/04 |
| 2012/0309373 A1 | 12/2012 | Abogenida |
| 2013/0189946 A1 | 7/2013 | Swanson |
| 2014/0228055 A1 | 8/2014 | Karaoguz |
| 2014/0244710 A1 | 8/2014 | Sharma |
| 2014/0320280 A1 | 10/2014 | Sager |
| 2015/0024781 A1 | 1/2015 | Konicek et al. |
| 2015/0048927 A1 | 2/2015 | Simmons et al. |
| 2015/0141037 A1 * | 5/2015 | Saha ................... H04W 4/021 455/456.1 |
| 2015/0156030 A1 * | 6/2015 | Fadell ................ H04L 12/2816 700/90 |
| 2015/0161834 A1 | 6/2015 | Spahl et al. |
| 2015/0168002 A1 | 6/2015 | Plitkins et al. |
| 2015/0312719 A1 | 10/2015 | Cho et al. |
| 2015/0365767 A1 | 12/2015 | Farrell |
| 2016/0012702 A1 | 1/2016 | Hart et al. |

* cited by examiner

AUTOMATIC SYSTEM CONTROL BASED ON MOBILE DEVICE LOCATION RELATIVE TO A PHYSICAL SPACE

CROSS-REFERENCE TO RELATED APPLICATION(S)

This application claims the benefit of priority to U.S. Provisional Patent Application No. 62/323,992, entitled, Automatic System Control Based on Mobile Device Location Relative to a Physical Space, which was filed on Apr. 18, 2016. The disclosure of the prior application is incorporated by reference herein in its entirety.

FIELD OF THE INVENTION

This disclosure relates to automatic system control (e.g., for a security monitoring system) and, more particularly, to automatic system control based on the location of a mobile device relative to a physical space where the system is operating or present.

BACKGROUND

Security monitoring systems, and other systems, such as home automation or the like, are ubiquitous. They are found in homes, businesses, and various other locations. When used properly, they can help to secure and ensure ongoing safety, security and comfort at a particular location.

SUMMARY OF THE INVENTION

According to one aspect, a system includes one or more devices at a physical space. Each device performs a function (e.g., security monitoring) at the physical space, and at least one is able to interact, via a network, with a mobile device. The system is automatically controlled based on a location of the mobile device. The system tracks the mobile device with a first tracking technique when located outside both a home region associated with the physical space and an active monitoring region that surrounds the home region, determines, based on the tracking information, whether the mobile device is within the active monitoring region, and switches to a second, different, tracking technique if it is determined that the mobile device is within the active monitoring region.

According to another aspect, a method is disclosed that may be implemented in a security monitoring system that includes a security monitoring device to monitor a physical space and to interact, via a network, with one or more computer-based mobile devices. The method is to automatically control the security monitoring system based on location information of at least one of the mobile devices relative to the monitored physical space. In particular, the method includes periodically receiving information about a mobile device's physical location from a mobile device's operating system using a first tracking technique when the mobile device is physically located outside both a home region associated with the monitored physical space and an active monitoring region that surrounds the home region. The method also includes using a software-based application running on the mobile device, to determine, based on the information periodically obtained about the mobile device's physical location using the first tracking technique, whether the mobile device is within the active monitoring region. The method further includes causing a switch to the second tracking technique if it is determined that the mobile device is within the active monitoring region. The method also includes periodically receiving information about the mobile device's physical location from a mobile device's operating system using the second tracking technique. The second tracking technique utilizes one or more different location tracking technologies than the first tracking technique.

In a system that includes one or more devices at a physical space, wherein each device is configured to perform an associated function in connection with the physical space, and wherein one or more of the devices are configured to interact, via a network, with one or more computer-based mobile devices, a method of automatically controlling the system based on location information of at least one of the mobile devices relative to the physical space, wherein the method comprises: tracking a mobile device's physical location with a first tracking technique when the mobile device is physically located outside both a home region associated with the physical space and an active monitoring region that surrounds the home region, determining, based on information obtained from tracking the mobile device's physical location using the first tracking technique, whether the mobile device is within the active monitoring region; and switching to a second tracking technique to track the mobile device's physical location if it is determined that the mobile device is within the active monitoring region, wherein the second tracking technique utilizes one or more different location tracking technologies than the first tracking technique.

The first tracking technique may utilize one or more location tracking technologies selected from the group consisting of: significant location change (SLC) technology, CLVisits technology, and region monitoring technology.

The second tracking technique may utilize the same location tracking technologies as the first tracking technique and one or more additional location tracking technologies selected from the group consisting of: Wi-Fi-based technology and cellular network monitoring technology.

The first tracking technique may utilize significant location change (SLC) technology, CLVisits technology, and region monitoring technology, and the second tracking technique may utilize the same location tracking technologies as the first tracking technique as well as Wi-Fi-based technology and cellular network monitoring technology.

The second tracking technique may utilize one or more location tracking technologies that require more battery power and provide a higher degree of accuracy than one or more location tracking technologies utilized by the first tracking technique.

In some implementations, the method further comprises: switching from the second tracking technique back to the first tracking technique to track the mobile device's physical location if it is determined that the mobile device is within the home region.

In some implementations, the method further comprises: changing an operating mode of the system if it is determined that the mobile device is within the home region. The system may be a security monitoring system that comprises a security monitoring device to monitor the physical space and to interact, via the network, with the one or more computer-based mobile devices, wherein the change in operating mode comprises automatically disarming one or more security features associated with the security monitoring system.

In some implementations, the method further comprises using global positioning system technology to determine the mobile device's physical location if the information about the mobile device's physical location from either the first tracking technique or the second tracking technique has an accuracy that overlaps with the home region. The global positioning system technology may be utilized very briefly to determine the mobile device's physical location.

In some implementations, the method further comprises using the first tracking technique to track the mobile device's physical location if the global positioning system technology reveals that mobile device is in the home region or outside both the home region and the active monitoring region; and using the second tracking technique to track the mobile device's physical location if the global positioning system technology reveals that mobile device is in the active monitoring region.

In some implementations, the method further comprises executing a software application at the mobile device, wherein the software application: periodically receives tracking information from the mobile device's operating system based on the first tracking technique, determines, based on the periodically received tracking information whether the mobile device is within the active monitoring region; causes the mobile device's operating system to switch to the second tracking technique if it is determined that the mobile device is within the active monitoring region; and periodically receives tracking information from the mobile device's operating system based on the second tracking technique.

In some implementations, the method further comprises changing an operating mode of the system if, after the mobile device has been in the home region, it is subsequently determined that the mobile device is outside the home region.

The system may be a security monitoring system that comprises a security monitoring device to monitor the physical space and to interact, via a network, with the one or more computer-based mobile devices, and the method may automatically controls the security monitoring system based on the location information of at least one of the mobile devices relative to the monitored physical space.

An outer edge of the active monitoring region may be substantially circular and located no more than 1500 meters from a center point, wherein the center point is inside the monitored space. An outer edge of the home region may be substantially circular and located no more than 150 meters from a center point, wherein the center point is inside the monitored space.

In a security monitoring system that comprises a security monitoring device to monitor a physical space and to interact, via a network, with one or more computer-based mobile devices, a method of automatically controlling the security monitoring system based on location information of at least one of the mobile devices relative to the monitored physical space, wherein the method comprises: periodically receiving information about a mobile device's physical location from a mobile device's operating system using a first tracking technique when the mobile device is physically located outside both a home region associated with the monitored physical space and an active monitoring region that surrounds the home region, using a software-based application running on the mobile device, to determine, based on the information periodically obtained about the mobile device's physical location using the first tracking technique, whether the mobile device is within the active monitoring region; causing a switch to the second tracking technique if it is determined that the mobile device is within the active monitoring region; and periodically receiving information about the mobile device's physical location from a mobile device's operating system using the second tracking technique, wherein the second tracking technique utilizes one or more different location tracking technologies than the first tracking technique.

The first tracking technique may utilize significant location change (SLC) technology, CLVisits technology, and region monitoring technology, and the second tracking technique may utilize the same location tracking technologies as the first tracking technique as well as Wi-Fi-based technology and cellular network monitoring technology.

In some implementations, the method further comprises changing an operating mode of the system if it is determined that the mobile device is within the home region.

In some implementations, the method further comprises using the mobile device operating system's global positioning system technology to determine the mobile device's physical location if the information obtained about the mobile device's physical location using either the first tracking technique or the second tracking technique has an accuracy that overlaps with the home region.

In another aspect, a system includes one or more devices at a physical space, wherein each device is configured to perform an associated function in connection with the physical space, and wherein one or more of the devices are configured to interact, via a network, with one or more computer-based mobile devices, and at least one computer-based mobile device, wherein each mobile device comprises a computer-based processor and memory, an operating system and application software configured to interact with the operating system.

The system may be operable so as to: track a mobile device's physical location with a first tracking technique when the mobile device is physically located outside both a home region associated with the physical space and an active monitoring region that surrounds the home region, determine, based on information obtained from tracking the mobile device's physical location using the first tracking technique, whether the mobile device is within the active monitoring region; and switch to a second tracking technique to track the mobile device's physical location if it is determined that the mobile device is within the active monitoring region. The second tracking technique may utilize one or more different location tracking technologies than the first tracking technique.

The mobile device may further comprise one or more modules selected from the group consisting of: a significant location change (SLC) module, a CLVisits module, and a region monitoring module, wherein the first tracking technique utilizes one or more location tracking technologies selected from the group consisting of: significant location change (SLC) technology, CLVisits technology, and region monitoring technology.

The mobile device may further comprise one or more modules selected from the group consisting of: a Wi-Fi module and a cellular network monitoring module, wherein the second tracking technique utilizes the same location tracking technologies as the first tracking technique and one or more additional location tracking technologies selected from the group consisting of: Wi-Fi-based technology and cellular network monitoring technology.

The mobile device may further comprise a significant location change (SLC) module, a CLVisits module, and a region monitoring module, a Wi-Fi module, and a cellular network monitoring module, wherein the first tracking technique utilizes significant location change (SLC) technology, CLVisits technology, and region monitoring technology, and wherein the second tracking technique utilizes the same location tracking technologies as the first tracking technique as well as Wi-Fi-based technology and cellular network monitoring technology.

The second tracking technique may utilize one or more location tracking technologies that require more battery power and provide a higher degree of accuracy than one or more location tracking technologies utilized by the first tracking technique.

In some implementations, the system may be further adapted to switch from the second tracking technique back to the first tracking technique to track the mobile device's physical location if it is determined that the mobile device is within the home region.

In some implementations, the system may be further adapted to change an operating mode of the system if it is determined that the mobile device is within the home region.

The system may be a security monitoring system that comprises a security monitoring device to monitor the physical space and to interact, via the network, with the one or more computer-based mobile devices, wherein the change in operating mode comprises automatically disarming one or more security features associated with the security monitoring system.

In some implementations, the system includes a global positioning system module, wherein the system is further configured to: use global positioning system technology to determine the mobile device's physical location if the information about the mobile device's physical location from either the first tracking technique or the second tracking technique has an accuracy that overlaps with the home region. The global positioning system technology may be utilized very briefly to determine the mobile device's physical location.

In some implementations, the system may be further adapted to use the first tracking technique to track the mobile device's physical location if the global positioning system technology reveals that mobile device is in the home region or outside both the home region and the active monitoring region; and use the second tracking technique to track the mobile device's physical location if the global positioning system technology reveals that mobile device is in the active monitoring region.

Each mobile device may be configured to execute a software application, wherein each software application: periodically receives tracking information from the mobile device's operating system based on the first tracking technique, determines, based on the periodically received tracking information whether the mobile device is within the active monitoring region; causes the mobile device to switch to the second tracking technique if it is determined that the mobile device is within the active monitoring region; and periodically receives tracking information from the mobile device's operating system based on the second tracking technique.

In some implementations, the system is further configured to: change an operating mode of the system if, after the mobile device has been in the home region, it is subsequently determined that the mobile device is outside the home region.

The system may be a security monitoring system that comprises a security monitoring device to monitor the physical space and to interact, via a network, with the one or more computer-based mobile devices, and the method may automatically control the security monitoring system based on the location information of at least one of the mobile devices relative to the monitored physical space.

An outer edge of the active monitoring region may be substantially circular and located no more than 1500 meters from a center point, wherein the center point is inside the monitored space.

An outer edge of the home region may be substantially circular and located no more than 150 meters from a center point, wherein the center point is inside the monitored space.

In another aspect, a security monitoring system to monitor a physical space and configured to change operating modes in response to location information from one or more associated computer-based mobile devices includes: a security monitoring device for positioning within the physical space and configured to interact, via a network, with one or more computer-based mobile devices, a computer-based mobile device comprising a computer-based processor, a computer-based memory, an operating system, and application software configured to interact with the operating system, wherein the security monitoring system is operable such that: the application software periodically receives information about the mobile device's physical location from the mobile device's operating system, which is using a first tracking technique when the mobile device is physically located outside both a home region associated with the monitored physical space and an active monitoring region that surrounds the home region, the application software determines, based on the information periodically obtained about the mobile device's physical location using the first tracking technique, whether the mobile device is within the active monitoring region; the application software causes a switch to the second tracking technique if it is determined that the mobile device is within the active monitoring region; and the application software periodically receives information about the mobile device's physical location from the mobile device's operating system, which is using the second tracking technique when the mobile device is deemed within the active monitoring region, wherein the second tracking technique utilizes one or more different location tracking technologies than the first tracking technique.

The mobile device may further include one or more modules selected from the group consisting of: a significant location change (SLC) module, a CLVisits module, and a region monitoring module, wherein the first tracking technique utilizes one or more location tracking technologies selected from the group consisting of: significant location change (SLC) technology, CLVisits technology, and region monitoring technology.

The mobile device may further include one or more modules selected from the group consisting of: a Wi-Fi module and a cellular network monitoring module, wherein the second tracking technique utilizes the same location tracking technologies as the first tracking technique and one or more additional location tracking technologies selected from the group consisting of: Wi-Fi-based technology and cellular network monitoring technology.

The mobile device may further comprise a significant location change (SLC) module, a CLVisits module, and a region monitoring module, a Wi-Fi module, and a cellular network monitoring module, wherein the first tracking technique utilizes significant location change (SLC) technology, CLVisits technology, and region monitoring technology, and wherein the second tracking technique utilizes the same location tracking technologies as the first tracking technique as well as Wi-Fi-based technology and cellular network monitoring technology.

The second tracking technique may utilize one or more location tracking technologies that require more battery power and provide a higher degree of accuracy than one or more location tracking technologies utilized by the first tracking technique.

The system may be configured to: switch from the second tracking technique back to the first tracking technique to track the mobile device's physical location if it is determined that the mobile device is deemed within the home region.

The system may be further configured to: change an operating mode of the system if it is determined that the mobile device is within the home region, wherein the change in operating mode comprises automatically disarming one or more security features associated with the security monitoring system.

The system may further include: a global positioning system module, wherein the system is further configured to: use global positioning system technology to determine the mobile device's physical location if the information about the mobile device's physical location from either the first tracking technique or the second tracking technique has an accuracy that overlaps with the home region.

The global positioning system technology may be utilized very briefly to determine the mobile device's physical location.

In some implementations, one or more of the following advantages are present.

System functionalities (e.g., security monitoring functionalities) are automated so that they are activated (or armed) when appropriate and deactivated (or disarmed) when appropriate. The arming and disarming occurs without the user having to affirmatively take any action (e.g., manually turn features on or off at a security system keypad, for example). The resulting system is able to more effectively function (e.g., ensure adequate security and safety in a monitored physical location). Moreover, the possibility of a system user entering the monitoring physical location without being noticed and without the system reacting first can be reduced.

Other features and advantages will be apparent from the description and drawings, and from the claims.

BRIEF DESCRIPTION OF THE DRAWINGS

Like reference numerals refer to like elements.

DETAILED DESCRIPTION

Figure 1:
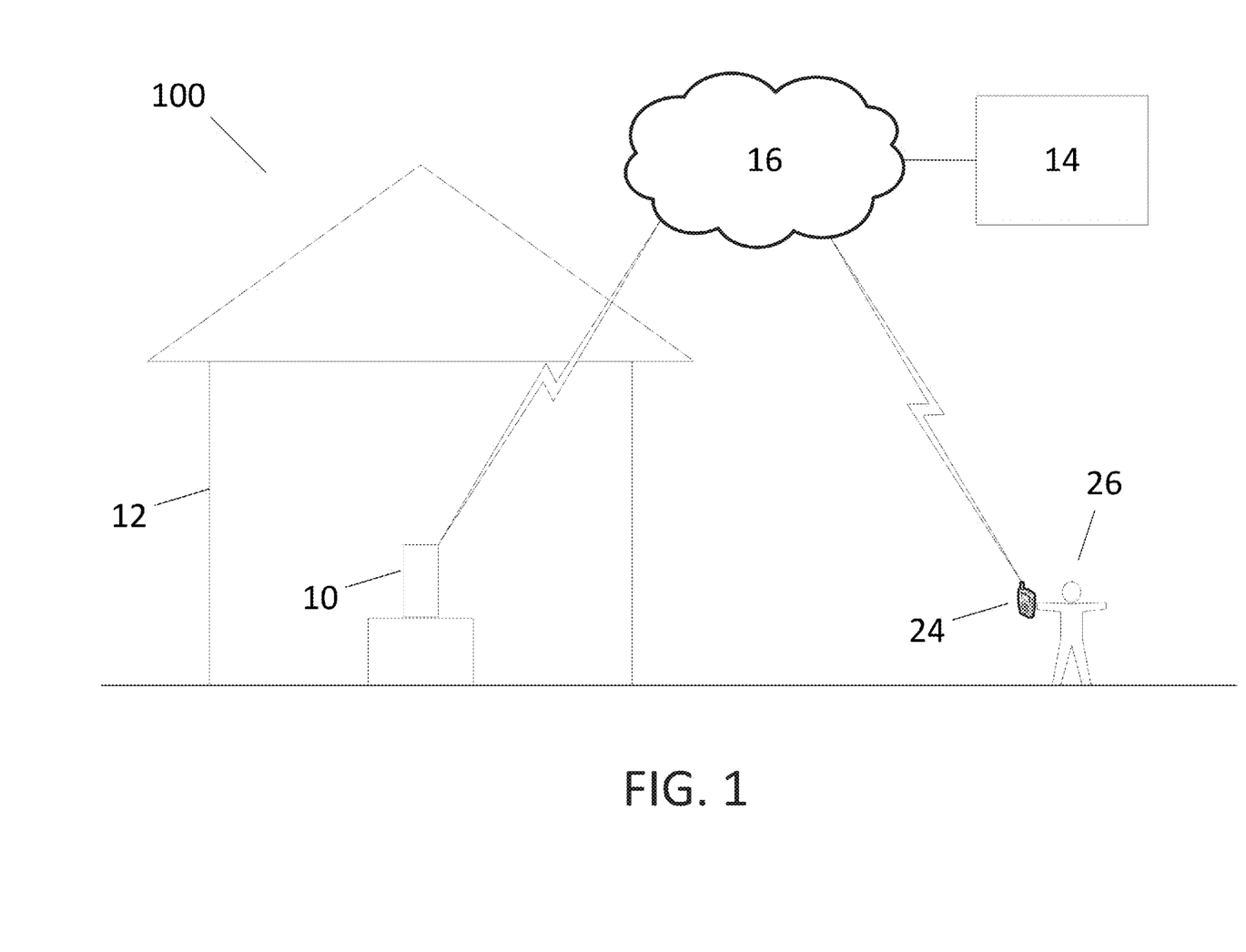
FIG. 1 is a schematic representation of an exemplary security monitoring system 100.

FIG. 1 is a schematic representation of an exemplary security monitoring system 100.

The illustrated security monitoring system 100 includes a security monitoring device 10 configured to monitor one or more security-related characteristics associated with the physical space where it is located (i.e., inside house 12). The illustrated security monitoring device 10 is further configured to communicate and interact with a cloud-based security processing system 14 and one or more computer-based mobile devices (e.g., smartphone 24), via a wireless communications network (e.g., the Internet 16).

The security monitoring device 10 is configured to monitor, in real time, one or more security-related characteristics associated with the associated monitored physical space. In this regard, in a typical implementation, the security monitoring device 10 has a plurality of sensors or detectors that may include, for example, one or more of the following: a video camera (that optionally includes night vision capability), a microphone, a motion detector, a temperature sensor, a humidity sensor, an air quality sensor, a smoke detector, an accelerometer, etc. In a typical implementation, the security monitoring device 10 also has an internal computer-based processor and memory to perform or facilitate processing of data collected by its one or more sensors or detectors. Moreover, in a typical implementation, the security monitoring device 10 has a communications module that facilitates communicating with other security monitoring system 100 components (e.g., the security processing system 14, any computer-based user interface devices (e.g., smartphone 24) and/or other components not specifically shown in FIG. 1.

The computer-based security processing system 14 has a computer-based processor and a memory storage device. The computer-based processor and memory storage device in the security processing system 14 are generally configured to process and store and/or facilitate processing and storing of at least some of the security-related data collected by and/or transmitted from the security monitoring device 10. The computer-based processing system 14 also has a communications module that facilitates communicating with other system components, including the security monitoring device 10, any computer-based user interface devices (e.g., smartphone 24) and/or other system components not specifically shown in FIG. 1.

The mobile device can be any kind of computer-based device that a person might use to access information over a network, such as the Internet 16. In the illustrated example, the mobile device is a smartphone 24. However, different mobile device can include tablets, cell phones, laptop computers, etc. In a typical implementation, each mobile device has a computer-based processor, a computer-based memory device, an operating system, and application software (e.g., an "app") configured to interact with the operating system to perform or facilitate one or more of the functionalities disclosed herein. Moreover, in a typical implementation, each mobile device includes a communications module that facilitates communicating with other system components, including the security monitoring device 10, the security processing system 14 and/or other system components not specifically shown in FIG. 1.

In the illustrated example, there is only one smartphone 24 shown and that smartphone belongs to a person 26 who lives in the home 12 where the monitored physical space is located.

Of course, in various implementations, several people may live in a particular home or work in a particular environment where a monitored physical space is located and each of those persons may have a smartphone or other computer-based user interface device. In general, in the illustrated example, if the security monitoring device 10 senses (or detects) data that suggests that an unsafe or otherwise undesirable circumstance exists (or has come into being) at the monitored physical space, then the system 100 notifies the person 26 at his or her mobile device 24.

Generally speaking, the system 100 is operable to change operating modes based on location information regarding one or more mobile devices. In one such example, one or more of the system's 100 security functionalities may become disabled (or disarmed) automatically when the person 26 enters a home region associated with the monitored physical space, but may become enabled (or armed) when the person 26 leaves the home region. Moreover, in a typical implementation, the automatic disarming and/or automatic arming may happen automatically based, at least in part, on the physical location of the person's mobile device 24 relative to the monitored physical space (or relative to the home region).

This kind of automatic arming and disarming can be desirable because people are not always as diligent with arming and disarming (especially arming) home security systems if the arming and/or disarming needs to be done manually (e.g., by entering a code on a security keypad or the like).

In a typical implementation, a mobile device has a variety of different location tracking technologies at its disposal. Some of the location tracking technologies are more accurate than others, and some of the location tracking technologies are more efficient (from a battery power perspective) than others. In a typical implementation, a mobile device has at least these tracking technologies at its disposal: significant location change (SLC) technology, CLVisits technology, region monitoring technology, Wi-Fi-based technology, cellular network monitoring technology and GPS technology. Of course, other tracking technologies (or different combinations of tracking technologies) may be available.

The system 100 is generally configured to leverage its available location tracking technologies in different ways depending on whether the mobile device is within a home region (i.e., inside or very near a monitored physical location), within an active monitoring region that surrounds the home region, or outside both the home region and the active monitoring region. Typically, as described herein, this enables the system 100 to track the mobile device's location at an appropriate level of accuracy while maintaining / preserving battery life.

Generally speaking, some location tracking technologies can be very power-intensive, particularly if a high degree of accuracy is desired or required. Most mobile devices have a limited battery capacity and maximizing battery life (or conversely, minimizing battery drain) can be a major consideration in the design and operation of a smartphone. Thus, it is highly advantageous that the system can provide highly accurate and reliable automatic arming and disarming (based on location of a mobile device) without causing an unduly significant drain the mobile device's battery resources.

Generally speaking, the system 100 recognizes three discrete physical regions relative to the monitored physical space. These include: 1) a home region that includes the monitored physical space and, typically, at least some space around the monitored physical space; 2) an active monitoring region that is outside and surrounds the home region, and 3) an outer region that is outside both the active monitoring region and the home region. The security monitoring system 100 is configured to behave differently depending on which of these regions a mobile device is located at any given point in time.

In a typical implementation, the mobile device includes software (e.g., an "app") that performs or facilitates one or more of the functionalities disclosed herein as being attributable to the mobile device (or smartphone or the like). Typically, the mobile device would belong to (or primarily used by) someone who lives at, works at, owns or rents, etc. the monitored physical space (e.g., a home, business, etc.).

Generally speaking, the security monitoring system 100 is configured to utilize relatively low-power, low-accuracy location tracking technique when the person's mobile device 24 is within the home region or in the outer region (outside both the home region and the active monitoring region) and to utilize relatively high-power, high-accuracy location tracking technology only when it is determined that the person's mobile device 24 is located in the active monitoring region (i.e., between the home region and the outer region). If the location information about the person's mobile device leaves some question as to which region the mobile device is located in, then the mobile device 24 may turn on its global positioning system (GPS) technology, which is very high power and high accuracy technology, to determine the mobile device's location. Typically, the mobile device 24 does this only long enough to get a more accurate location (e.g., no more than 2-3 seconds at a time, typically). GPS retries to get more accurate location can be, in some implementations, approximately every two minutes.

This three-region (home, active monitoring, and outer) approach provides highly accurate location monitoring functionality when it matters most—i.e., when the person's mobile device is in the active monitoring region (i.e., near, but not ithin the home region). Once the mobile device has been determined to be inside the home region or outside the active monitoring region, the system operates in a manner to preserve battery life.

Figure 2:
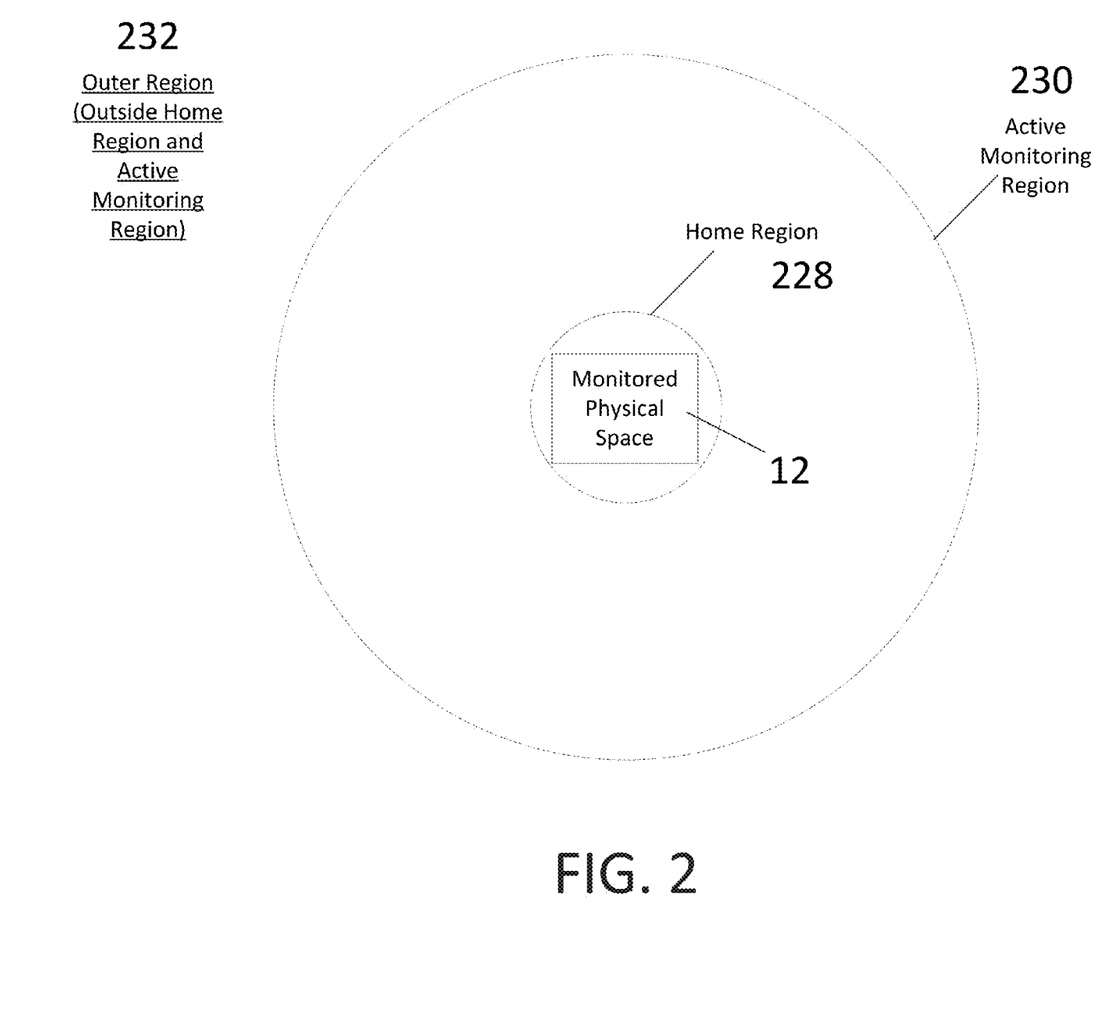
FIG. 2 is an exemplary schematic plan view showing a monitored physical space and the three regions associated with the monitored physical space, namely: a home region, an active monitoring region, and the outer region.

FIG. 2 is an exemplary schematic plan view showing a monitored physical space 12 and the three regions associated with the monitored physical space 12, namely: the home region 228, the active monitoring region 230 and the outer region 232.

The monitored physical space 12 can be virtually any space that is capable of being monitored for security (safety) by a security monitoring system (e.g., 100). For example, the monitored physical space 12 may be a person's home, place of business, community center, or other building, structure, etc.

As shown in the illustrated example, the home region 228 is roughly circular and is substantially centered on and surrounds the monitored physical space 12. The home region 228 in the illustrated example includes the entirety of the monitored physical space 12 and some amount of space just outside the monitored physical space 12. In some implementations, the home region 228 has an outer edge that is substantially circular and located at least 150 meters from a center point, where the center point is inside the monitored physical space 12. Of course, in some implementations, the home region may be smaller than 150 meters (e.g., its outer edge is no more than 150) from its center point; this may be the case, for example, where highly accurate technologies are being utilized.

The active monitoring region 230 is roughly circular as well. In the illustrated example, the active monitoring region 230 extends from an outer boundary of the home region 228 radially outward to an outer edge. in some implementations, the active monitoring region 230 has an outer edge that is substantially circular and located at least 1500 meters from a center point, where the center point is inside the monitored space. Of course, in some implementations, the active monitoring region may be smaller than 1500 meters (e.g., its outer edge is no more than 1500 meters) from its center point; this may be the case, for example, where highly accurate technologies are being utilized.

The outer region 232 in the illustrated example includes everywhere beyond the outer edge of the active monitoring region 230—so, everywhere outside both the home region 228 and the active monitoring region 230.

The size and configuration of each region (home, active monitoring and outer) can vary. In a typical implementation, the home region 228 has a physical size that is larger than a typical monitored physical space 12. (e.g., the person's home or place of business, etc.). In some implementations, the home region 228 is larger than the footprint of the home or place of business where monitored physical space 12 is located (as shown in the illustrated example). In some implementations, the system may be operable so as to enable a user to specify the size and configuration of the home region and the active monitoring region. In other implementations, these are fixed.

In a typical implementation, the active monitoring region 230 may be at least large enough that a person with a mobile device at an outer edge of the active monitoring region will not be able to reasonably travel through the entire active monitoring region 230 and reach an outer boundary of the home region 228 without the mobile device's significant location change (SIX) functionality providing an indication if the mobile device has moved a significant distance. For example, in some implementations, the active monitoring region has an outer boundary that is approximately (or at least) 1,500 meters from a center point that would be located in the monitored physical space.

Figure 3:
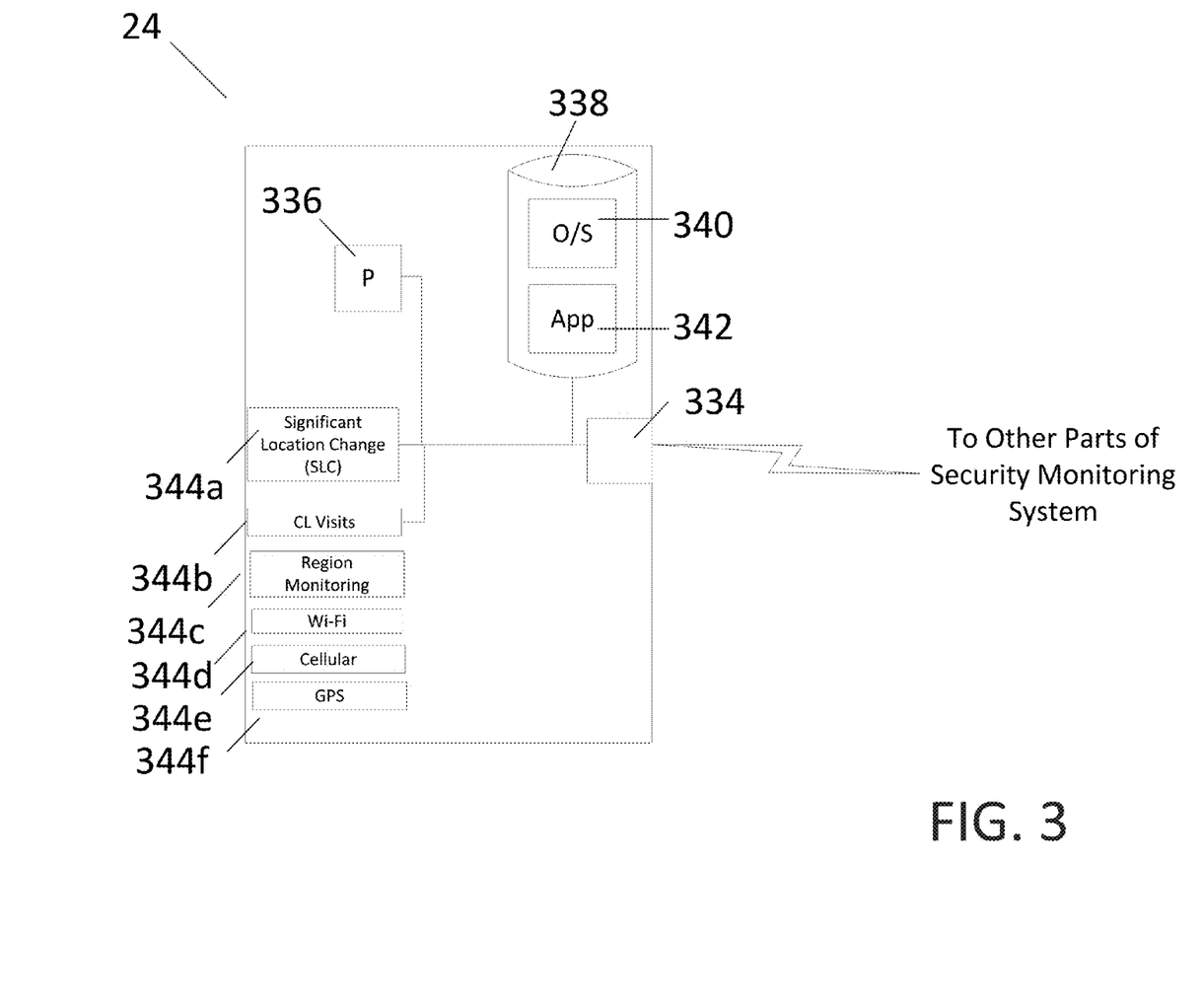
FIG. 3 is a partial schematic representation of a mobile device smartphone) that is configured to communicate and/or interact as part of a security monitoring system.

FIG. 3 is a partial schematic representation of a mobile device 24 (e.g., a smartphone) that is configured to communicate with and/or interact as part of a security monitoring system 100. In this regard, the mobile device 24 includes a communications module 334 that enables the mobile device to communicate wirelessly with other system components, such as the security monitoring device 10 and/or the security processing system 14 via network 16.

The illustrated mobile device 24 also has computer-based memory 338 and a computer-based processor 336 that store and run an operating system 340 and application software 342 that interacts with the operating system 340 to perform and/or facilitate one or more of the functionalities disclosed herein, namely the functionalities described herein as being associated with the mobile device 24.

The mobile device 24 also includes a collection of location tracking modules including, for example, a significant location change (SLC) module 344a, a CL Visits module 344b, a region monitoring module 344c, a Wi-Fi module 344d, a cellular module 344e and a GPS module 344f. Generally speaking the mobile device 24 is operable to function using two different tracking techniques—a first utilizing relatively low-accuracy, low-power technologies/modules (e.g., significant location change (SLC), CL Visits, and/or region monitoring), and a second utilizing the same technologies/modules as the first and adding other relatively high-accuracy, high power technology (e.g., Wi-Fi and cellular-based location technologies).

Figure 4A:
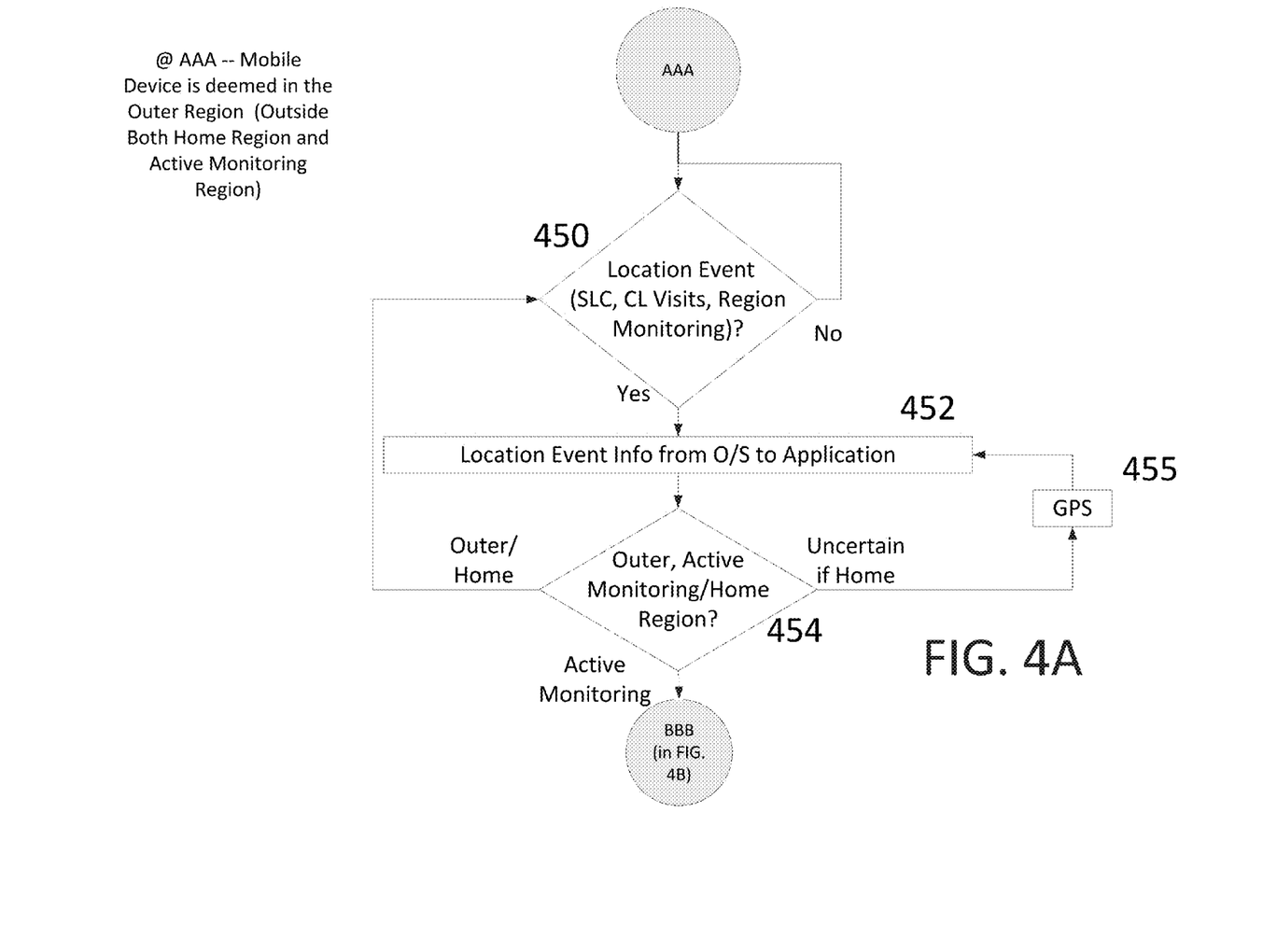
FIGS. 4A and 4B are flowcharts that show exemplary processes implemented by a security monitoring system.
Figure 4B:
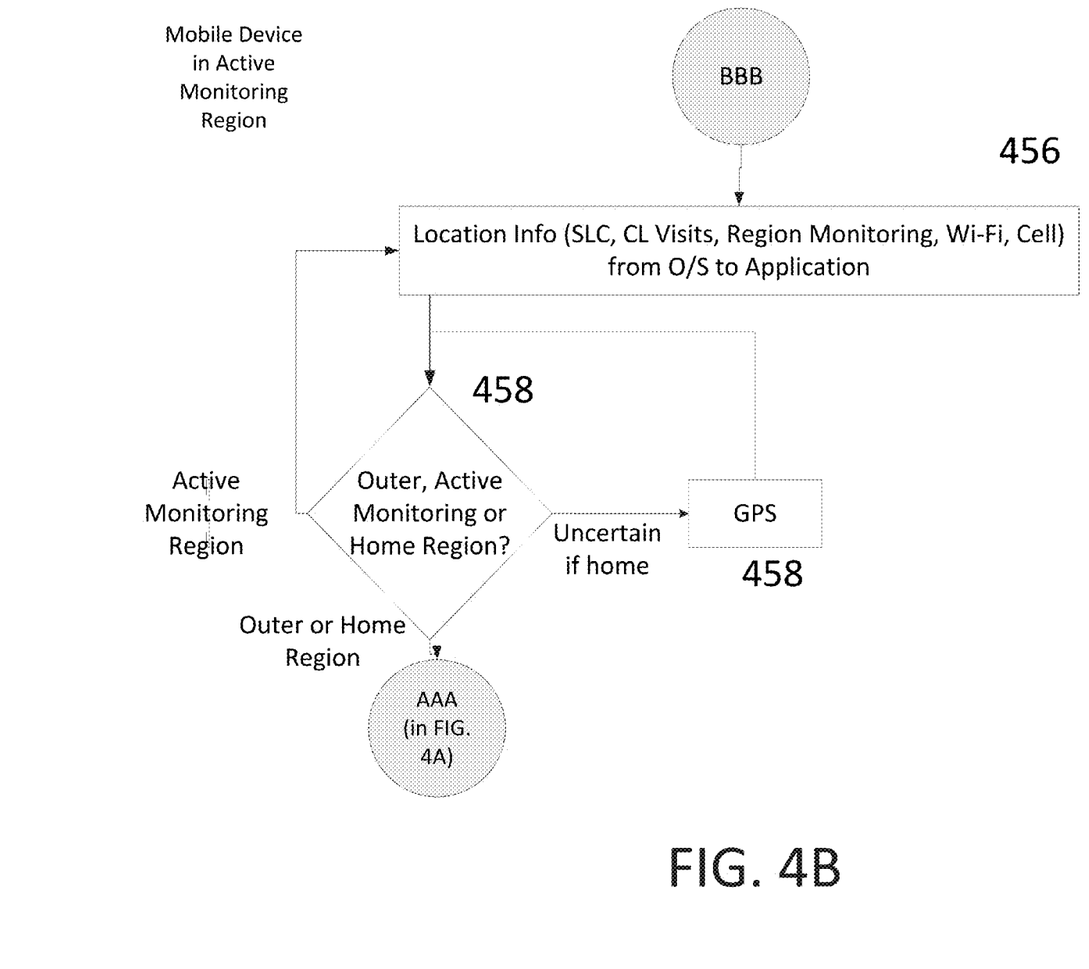

FIGS. 4A and 4B are flowcharts that show exemplary processes implemented by the security monitoring system 100. More particularly, the flowchart in FIG. 4A represents an exemplary process implemented (starting at AAA) by the security monitoring system 100 if the system 100 determines that the mobile device (e.g., 24) is outside both the home region 228 and the active monitoring region 230 (e.g., in the outer region). The flowchart in FIG. 4B represents an exemplary process implemented by the security monitoring system 100 if the system determines that the mobile device (e.g., 24) is inside the active monitoring region 230 (i.e., between the home region 228 and the outer region 232).

Referring now to FIG. 4A, when the mobile device 24 is in the outer region 232 (i.e., outside both the home region 228 and the active monitoring region 230), the system 100 tracks the mobile device's 24 physical location using a first tracking technique that tends to be a relatively low accuracy and low power technique.

According to the illustrated example, the first tracking technique utilizes the following technologies in the mobile device (or similar technologies): significant location change (SLC) technology, CL Visits technology, and region monitoring (or geo-fencing) technology. In a typical implementation, the mobile device 24 would include a module to support each respective one of these technologies.

Generally speaking, SLC technology is a service that leverages the operating system of certain mobile devices, such as the IPhone® mobile device available from the Apple® or other similar devices, to provide information about the mobile device's physical location. In a typical implementation, SLC technology provides a rough estimation of the mobile device's physical location and a degree of accuracy associated with that rough estimation. Moreover, typically, the rough estimation and degree of accuracy provided in SLC technology are only provided if and when the mobile device 24 has experienced a significant change in location, typically 500 meters or more.

Region monitoring (or geo-fencing) technology generally refers to the practice of using some combination of Wi-Fi, cellular and/or global positioning system (GPS) technologies to define geographic boundaries. In region monitoring, once a geo-fence has been established, the operating system of the mobile device 24, or other system component, can send an app notification when the mobile device 24 enters (or exits) the specified area. A geo-fence can be thought of as a virtual perimeter for a real-world geographic area. A geo-fence can be defined by a radius around a point location, for example, or can be a predefined set of boundaries. The use of a geo-fence is called geo-fencing, and one example of usage involves a location-aware device of a location-based service user entering or exiting a geo-fenced area. This activity could trigger an alert to the device's user as well as messaging to the geo-fence operator.

Generally speaking, the core location framework helps identify the current location of a mobile device. In that framework, a CL Visit object encapsulates information about interesting places that the user has been. The visit can includes the location where the visit occurred and information about the arrival and departure times as relevant. Visit objects contain as much information about the visit as possible but may not always include both the arrival and departure times. For example, when the user arrives at a location, the system may send an event with only an arrival time. When the user departs a location, the event can contain both the arrival time (if your app was monitoring visits prior to the user's arrival) and the departure time. CLVisits is a specific name of a type of technology currently used in iOS. The broader, more generally applicable way to describe CLVisits is a location service technology that is part of an operating system running on a mobile device (which could be a phone, wearable, tablet, etc.). In a typical implementation, reference to CLVisits, or the like, herein should be construed in accordance with the broader description.

Generally speaking, when the mobile device 24 is in the outer region, the mobile device 24 is utilizing these (or similar) functionalities to track its location with the goal of balancing the need for accuracy and preserving battery life.

According to the illustrated flowchart, if the mobile device 24 is deemed to be in the outer region 232, the app on the mobile device 24 periodically (at 450) receives location event data. The location event data may be provided to the app, for example, by any one of the location tracking technologies being utilized by the mobile device for that purpose. For example, if the mobile device 24 experiences a significant change in location (e.g., greater than 500 meters), then (at 450), the mobile device's operating system leverages its SLC functionality to provide SLC information (e.g., a rough estimation of the mobile device's new physical location and an estimated degree of accuracy associated with that rough estimation) to the app on the mobile device 24.

Similarly, if a region monitoring (geo-fencing) event or a CL Visits event happens while the mobile device 24 is deemed to be in the outer region, the app will receive location information from those respective technologies in the mobile device 24.

The system 100 then determines (at 454), based on the location data it receives, which region the mobile device 24 is located (e.g., outer, active monitoring, or home). In a typical implementation, the app on the mobile device 24 makes this determination.

If the system 100 determines (at 454) that the mobile device 24 is either still in the outer region or is in the home region, then the system 100 returns to 450 and the app on the mobile device 24 periodically (at 450) receives location event data, based on the indicated, low-power, low-accuracy technologies (i.e., SLC, CL Visits, and Region Monitoring). If the system 100 determines (at 454) that the mobile device 24 is in the active monitoring region, then the system 100 proceed as indicated to BBB in FIG. 4B.

If the system 100 determines (at 454) that it is uncertain whether the mobile device 24 is in the home region or not (e.g., because the accuracy associated with the location event data allows for the possibility that the mobile device 24 is in the home region or elsewhere), then the system 100 (at 455) momentarily activates GPS to obtain accurate location information for the mobile device 24.

Generally speaking, GPS is a highly accurate location tracking technology. Therefore, it can be a useful technology to leverage when more accurate location information is needed. However, it also represents a relatively large drain on the mobile device's battery. Therefore, when the system needs to turn on GPS to obtain more accurate location information, typically, it does so only very briefly, typically only long enough to resolve any question about which region the mobile device 24 is located. As an example, when GPS is activated, it may be activated for no more than 5 seconds and often less than that (e.g., no more than 3 seconds or no more than 2 seconds, etc.).

According to the illustrated flowchart, the GPS location information is provided (at 452) from the operating system to the app in the mobile device 24 and, utilizing that GPS location information, the app, for example, determines (at 454) which region the mobile device 24 is in. Typically, the determination as to whether there is any possibility that the mobile device 24 is within the active monitoring region 230 is performed by a processor on the mobile device 24 executing a software app on the mobile device 24. In some implementations, however, that determination may be made elsewhere in the system 100 (e.g., at the cloud-based security processing system, etc.).

Referring now to FIG. 4B, if the system 100 has determined that the mobile device 24 is in the active monitoring region 230 (i.e., the region between the home region 228 and the outer region 232), the system 100 tracks (456) the mobile device's 24 physical location using a second tracking technique 456 that tends to be relatively high-accuracy and high-power. The phrases high-accuracy and high-power used in this regard should be understood as high relative to the low-accuracy and low-power associated with the first tracking technique.

In the illustrated example, the second tracking technique 456 utilizes the same location tracking technologies as the first tracking technique, namely SLCs, CL Visits, and Region Monitoring, and also adds on a few other location tracking technologies including Wi-Fi and cellular-based tracking technologies. Generally speaking, the added location tracking technologies provide for more accurate tracking, but, of course, require more power to operate than the other techniques.

When the mobile device 24 is in the active monitoring region, the mobile device 24 utilizes these (or similar) functionalities to track its location with the goal of balancing the need for accuracy and preserving battery life. Thus, in a typical implementation, the mobile device may toggle between utilizing one or more of these different technologies when the mobile device 24 is in the active monitoring region.

When the system 100 utilizes the second tracking technique, the software application on the mobile device 24 receives (at 456) regular, somewhat frequent (e.g., at least every 10 seconds) updates on the mobile device's physical location. Moreover, the system 100 (e.g., the software app on the mobile device 24) regularly and periodically processes the SL service location information it receives.

The system 100 (e.g., the app on the mobile device 24) determines (at 458), based on the information it receives, whether the mobile device 24 is still in the active monitoring region, in the outer region or in the home region.

If the system 100 determines (at 458) that the mobile device 24 is in the active monitoring region, then the system 100 continues to track the mobile device's location utilizing the high-accuracy, high power second tracking technique.

If the system 100 determines (at 458) that the mobile device 24 is in the home region or in the outer region, the system proceeds to AAA in FIG. 4A and starts utilizing the low-power, low-accuracy first tracking technique.

If the system 100 determines (at 454) that it is uncertain whether the mobile device 24 is located in the home region or not (e.g., because the accuracy associated with the location event data allows for the possibility that the mobile device 24 is in the home region or elsewhere), then the system 100 (at 459) momentarily activates GPS to obtain accurate location information for the mobile device 24.

Figure 5:
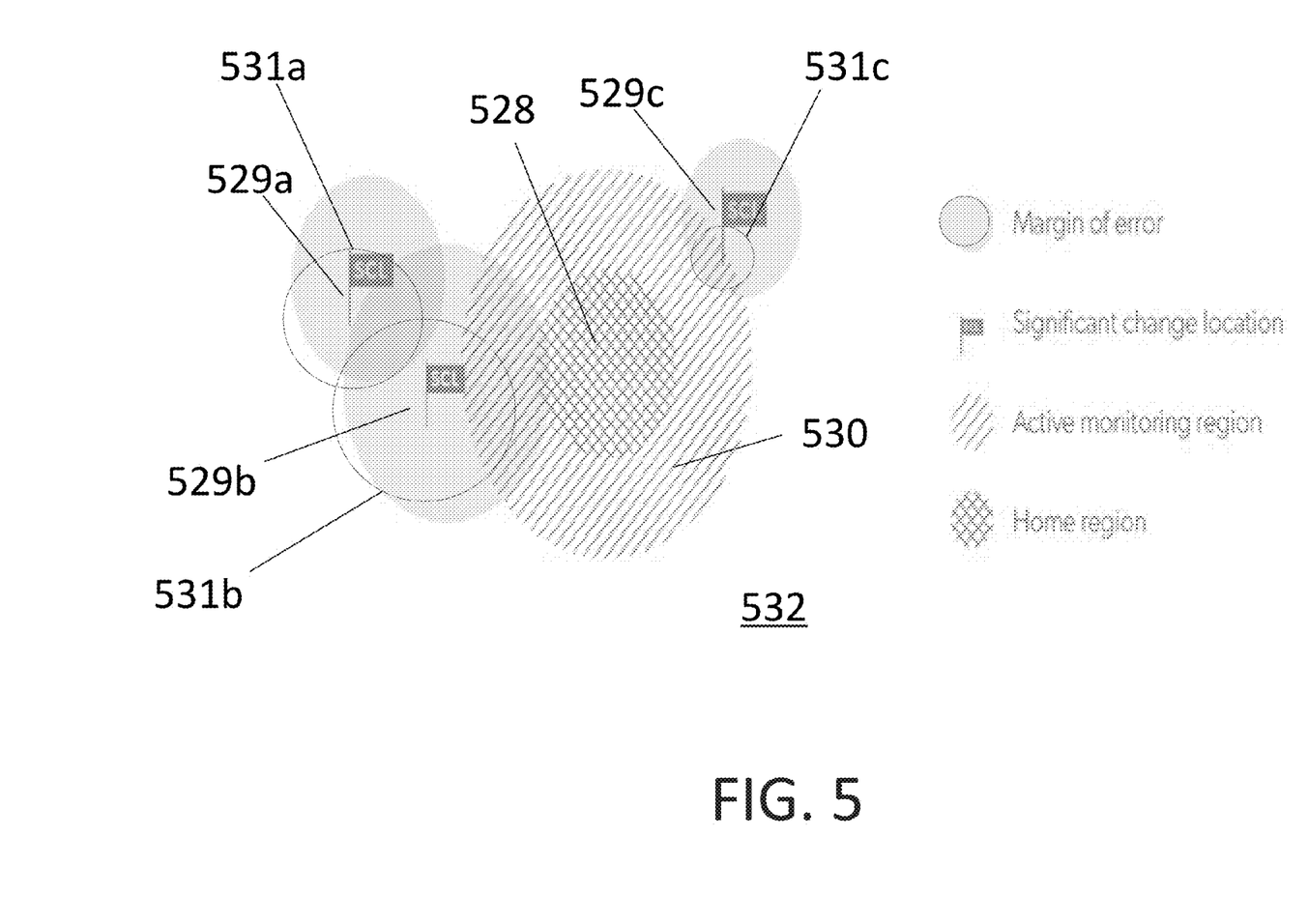
FIG. 5 is yet another schematic plan view representing an exemplary home region, active monitoring region and outer region associated with a monitored physical location.

FIG. 5 is yet another schematic plan view showing three regions associated with a monitored physical space, namely: a ho region 528, an active monitoring region 530 and an outer region 532.

Also shown in the illustrated schematic are three significant change location (SCL) indicators 529a, 529b, 529c and a representation of the margin of error (e.g., degree of accuracy) 531a, 531b, 531c associated with each indicator. In general, each SLCindicator 529a, 529b, 529c identifies a location where the security monitoring system (e.g., 100) became aware that a mobile device has experienced a significant change in location. In some implementations, the app disregards new location information if it has received location information within the past 30 seconds. Generally speaking, in a typical implementation, locations may be considered every 30 seconds.

SCL indicators 529a and 529b are in the outer region 532 (i.e., outside both the home region 528 and the active monitoring region 530). SLC indicator 529c is in the active monitoring region 530.

The margin of error 531a associated with SLCindicator 529a does not overlap with the active monitoring region 530. Therefore, the security monitoring system would determine, with certainty, that the mobile device is within the active monitoring region 530 based on that indicator. The system, therefore, in response to processing SLCindicator 529a would simply utilize the low-power, low-accuracy tracking technique (e.g., leveraging the SLCCL Visits, and Region Monitoring functionalities of the mobile device). There would be no need to turn on GPS to confirm this course of action.

The margin of error 531b associated with SLCindicator 529b, however, does overlap with the active monitoring region 530. Therefore, in reacting to SLCindicator 529b, the security monitoring system would not be able to determine with certainty what region the mobile device was located in. Therefore, the system (e.g., the mobile device), in response to SLCindicator 529b, would turn on the GPS momentarily to confirm the region.

The margin of error 531c associated with SLCindicator 529c overlaps with the outer region. Therefore, in reacting to SLCindicator 529c, the security monitoring system would not be able to determine with certainty what region the mobile device was located in. Therefore, the system, in reacting to SLCindicator 529c, would momentarily turn on GPS to confirm location.

A number of embodiments of the invention have been described. Nevertheless, it will be understood that various modifications may be made without departing from the spirit and scope of the invention.

For example, although the detailed description provided herein focuses largely on security monitoring, the concepts described herein could be applied to any sort of system that has one or more devices (e.g., thermostats, cameras, etc.) at a particular physical space, with each device being configured to perform a particular associated functionality in connection with the physical space, and where one or more of those devices is configured to interact, via a network, with one or more computer-based mobile devices (e.g., mobile devices, or the like). In those examples, the techniques and systems disclosed herein could be adapted to automatically controlling the system (including, for example, the device(s)) based on location information of at least one of the mobile devices relative to the physical space.

Moreover, the system disclosed herein mentions only one mobile device. However, the concepts can easily be applied to systems where there are multiple users (and, therefore, multiple mobile devices). In one such example, if there are multiple users (each with his or her own mobile device) that live at a particular home together, the system may track each individual's mobile device substantially as described herein and automatically disarm when the first of those users is determined to be home.

The operating mode changes that the system automatically experiences can vary considerably as well and may depend, in part, on the specific capabilities/functionalities of the system itself. In one example, if the system determines, based on a mobile device's location, that a particular person has arrived at home, the system may change operating modes so that any security (safety) events that occur (and are identified by the security monitoring system) while the person is at home, are not communicated to the person's mobile device. In another example, the system will disarm all (or some) of its security (safety) monitoring capabilities when the system determines that a first one of multiple users associated with a particular monitored location is present (e.g., within the home region). Likewise, the same system may arm all (or some) of its security monitoring capabilities when the system determines that all of the users associated with a particular monitored location are absent (e.g., away from the home region).

In implementations where the system is a security monitoring system, the security monitoring system can be virtually any kind of system that is able to monitor security or safety related characteristics associated with a particular location. Some the characteristics that might be monitored include: presence of potential intruder(s), smoke, heat, carbon monoxide, other air quality issues, sound (e.g., broken glass, loud noise, etc.) and combinations of these and other characteristics. In a typical implementation, the security monitoring device is a single component, with a single housing and sensors and/or other subcomponents are coupled to and/or inside the housing. However, the security monitoring device can be implemented as a collection of components (e.g., sensors, processors, communication modules, etc.) spread out throughout the monitored physical location.

The mobile device 24 can be virtually any kind of computer-based mobile phone or similar device including, for example, a smartphone or the like. Generally speaking, a smart smartphone is a mobile phone with an advanced mobile operating system that combines features of a personal computer operating system with other features useful for mobile or handheld use. In some implementations, the mobile device can be a hardware fob.

The cloud-based security processing system can be virtually any kind of network-based computer or collection of computers or components. In some implementations, the cloud-based security processing system is provides shared processing resources and data to help support certain system functionalities disclosed herein.

Certain system functionalities disclosed herein can be performed by a computer-based processor, for example, in the security monitoring device, the cloud-based security processing system, the mobile device, or two or more of these system components.

The specific tracking functionalities that are leveraged or utilized when the mobile device is in the different regions can vary and may depend, for example, on the specific technology platform where the systems and techniques disclosed herein a being deployed. However, generally speaking, the system is operable so that, when a mobile device is within the active monitoring region, a higher accuracy, typically higher power approach to tracking the mobile device's location is utilized, whereas when the mobile device is either in the outer region or the home region, a lower accuracy, typically lower power approach to tracking the mobile device's location is utilized.

The relative terms "high" and "low" and variations thereof, are used herein to describe accuracy and power, etc. These terms should be construed broadly, but, when used together, should be understood as contrasting each other. For example, when used together, it should be understood that "high" means higher than whatever has been described as being "low," and "low" means lower than whatever has been described as being "high." So, if the application mentions a "high accuracy" tracking technique and a "low accuracy" tracking technique, it should be understood that the "high accuracy" tracking technique has a higher accuracy than the "low accuracy" tracking technique.

It should be understood that other relative terminology may have been used herein, and, unless otherwise indicated, that relative terminology is used solely for the purposes of clarity and is not intended to limit the scope of what is described here to require particular positions and/or orientations. Accordingly, such relative terminology should not be construed to limit the scope of the present application. Additionally, unless otherwise indicated, the term substantially, and similar words, should be construed broadly to mean completely or almost completely (e.g., the phrase substantially centered may mean either centered or off center by no more than a 10 meters or so).

The systems and techniques disclosed herein can be implemented in virtually any kind of system or home security (safety) system that is able to access real time information regarding the whereabouts of mobile devices that belong to or are associated with people who own, live at or work at a monitored physical space.

In various implementations, one or more of the devices disclosed herein may be configured to communicate wirelessly over a wireless communication network via one or more wireless communication protocols including, but not limited to, cellular communication, ZigBee, REDLINK™, Bluetooth, IrDA, dedicated short range communication (DSRC), EnOcean, and/or any other suitable common or proprietary wireless protocol.

In some implementations, certain functionalities described herein may be provided by a downloadable software application (i.e., an app). The app may, for example, implement or facilitate one or more of the functionalities described herein as taking place on a mobile device directly or at or in association with a website.

In some implementations, location updates can be triggered by events other than user movement. For example, other applications can trigger a location event that the app described herein will be notified of Also, a mobile device could switch between cell towers causing the operating system to think it has moved a significant amount even when it has not.

In various embodiments, certain aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors).

Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

The operations described in this specification can be implemented as operations performed by a data processing apparatus (e.g., a processor) on data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other implementations are within the scope of the claims.

What is claimed is:

1. In a system that includes one or more devices at a physical space, wherein each device is configured to perform an associated function in connection with the physical space, and wherein one or more of the devices are configured to interact, via a network, with one or more computer-based mobile devices, a method of automatically controlling the system based on location information of at least one of the mobile devices relative to the physical space, wherein the method comprises:
tracking a mobile device's physical location with a first tracking technique when the mobile device is physically located outside both a home region associated with the physical space and an active monitoring region that surrounds the home region, determining, based on information obtained from tracking the mobile device's physical location using the first tracking technique, whether the mobile device is within the active monitoring region; and switching to a second tracking technique to track the mobile device's physical location if it is determined that the mobile device is within the active monitoring region, wherein the second tracking technique utilizes one or more different location tracking technologies than the first tracking technique.

2. The method of claim 1, wherein the first tracking technique utilizes one or more location tracking technologies selected from the group consisting of: significant location change (SLC) technology, CLVisits technology, and region monitoring technology.

3. The method of claim 2, wherein the second tracking technique utilizes the same location tracking technologies as the first tracking technique and one or more additional location tracking technologies selected from the group consisting of: Wi-Fi-based technology and cellular network monitoring technology.

4. The method of claim 1, wherein the first tracking technique utilizes significant location change (SLC) technology, CLVisits technology, and region monitoring technology, and wherein the second tracking technique utilizes the same location tracking technologies as the first tracking technique as well as Wi-Fi-based technology and cellular network monitoring technology.

5. The method of claim 1, wherein the second tracking technique utilizes one or more location tracking technologies that require more battery power and provide a higher degree of accuracy than one or more location tracking technologies utilized by the first tracking technique.

6. The method of claim 1, further comprising:
switching from the second tracking technique back to the first tracking technique to track the mobile device's physical location if it is determined that the mobile device is within the home region.

7. The method of claim 1, further comprising:
changing an operating mode of the system if it is determined that the mobile device is within the home region.

8. The method of claim 7, wherein the system is a security monitoring system that comprises a security monitoring device to monitor the physical space and to interact, via the network, with the one or more computer-based mobile devices, wherein the change in operating mode comprises automatically disarming one or more security features associated with the security monitoring system.

9. The method of claim 1, further comprising:
using global positioning system technology to determine the mobile device's physical location if the information about the mobile device's physical location from either the first tracking technique or the second tracking technique has an accuracy that overlaps with the home region.

10. The method of claim 9, wherein the global positioning system technology is utilized very briefly to determine the mobile device's physical location.

11. The method of claim 9, further comprising:
using the first tracking technique to track the mobile device's physical location if the global positioning system technology reveals that mobile device is in the home region or outside both the home region and the active monitoring region; and using the second tracking technique to track the mobile device's physical location if the global positioning system technology reveals that mobile device is in the active monitoring region.

12. The method of claim 1, further comprising:
executing a software application at the mobile device, wherein the software application:
periodically receives tracking information from the mobile device's operating system based on the first tracking technique,
determines, based on the periodically received tracking information whether the mobile device is within the active monitoring region;
causes the mobile device's operating system to switch to the second tracking technique if it is determined that the mobile device is within the active monitoring region; and
periodically receives tracking information from the mobile device's operating system based on the second tracking technique.

13. The method of claim 1, further comprising:
changing an operating mode of the system if, after the mobile device has been in the home region, it is subsequently determined that the mobile device is outside the home region.

14. The method of claim 1, wherein the system is a security monitoring system that comprises a security monitoring device to monitor the physical space and to interact, via a network, with the one or more computer-based mobile devices, and wherein the method automatically controls the security monitoring system based on the location information of at least one of the mobile devices relative to the monitored physical space.

15. The method of claim 1, wherein an outer edge of the active monitoring region is substantially circular and located no more than 1500 meters from a center point,
wherein the center point is inside the monitored space.

16. The method of claim 1, wherein an outer edge of the home region is substantially circular and located no more than 150 meters from a center point,
wherein the center point is inside the monitored space.

17. In a security monitoring system that comprises a security monitoring device to monitor a physical space and to interact, via a network, with one or more computer-based mobile devices, a method of automatically controlling the security monitoring system based on location information of at least one of the mobile devices relative to the monitored physical space, wherein the method comprises:

periodically receiving information about a mobile device's physical location from a mobile device's operating system using a first tracking technique when the mobile device is physically located outside both a home region associated with the monitored physical space and an active monitoring region that surrounds the home region, using a software-based application running on the mobile device, to determine, based on the information periodically obtained about the mobile device's physical location using the first tracking technique, whether the mobile device is within the active monitoring region;

causing a switch to the second tracking technique if it is determined that the mobile device is within the active monitoring region; and periodically receiving information about the mobile device's physical location from a mobile device's operating system using the second tracking technique, wherein the second tracking technique utilizes one or more different location tracking technologies than the first tracking technique.

18. The method of claim 17, wherein the first tracking technique utilizes significant location change (SLC) technology, CLVisits technology, and region monitoring technology, and wherein the second tracking technique utilizes the same location tracking technologies as the first tracking technique as well as Wi-Fi-based technology and cellular network monitoring technology.

19. The method of claim 17, further comprising:

changing an operating mode of the system if it is determined that the mobile device is within the home region.

20. The method of claim 17, further comprising:

using the mobile device operating system's global positioning system technology to determine the mobile device's physical location if the information obtained about the mobile device's physical location using either the first tracking technique or the second tracking technique has an accuracy that overlaps with the home region.

* * * * *